Patented Dec. 27, 1938

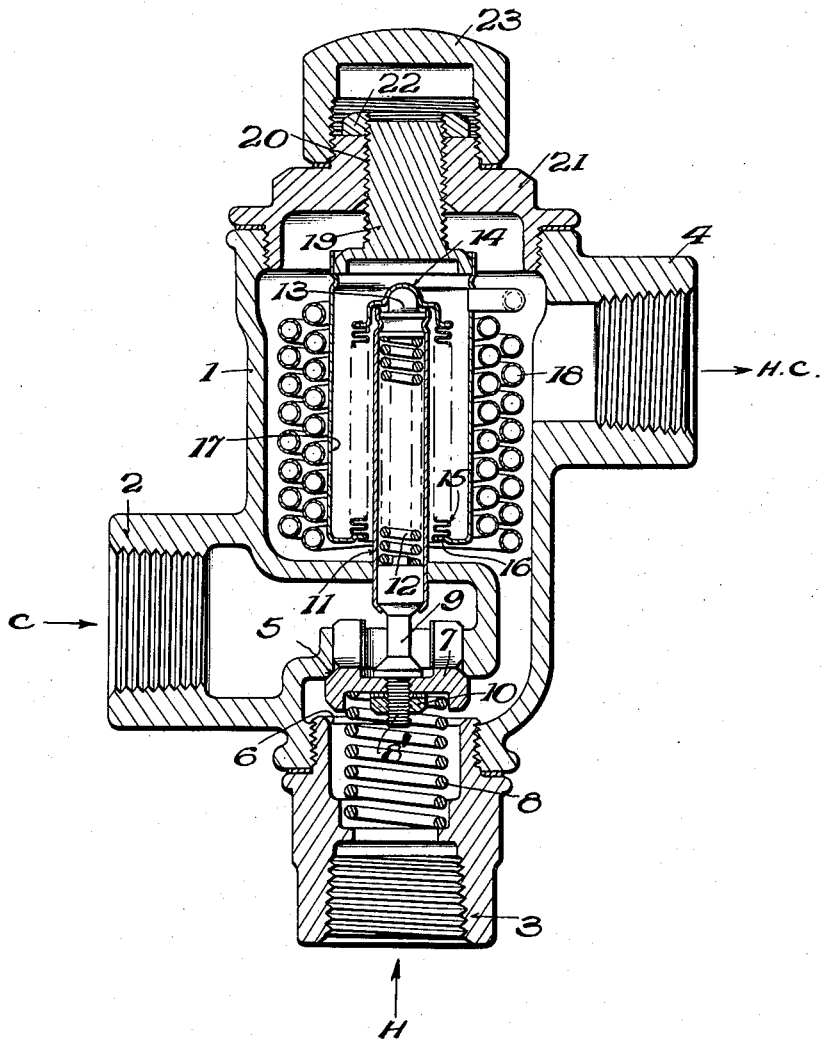

2,141,520

UNITED STATES PATENT OFFICE 2,141,520

THERMOSTATICALLY CONTROLLED MIXING VALVE

John E. Dube, Knoxville, Tenn., assignor to The Fulton Sylphon Company, Knoxville, Tenn., a corporation of Delaware Application December 30, 1935, Serial No. 56,807

7 Claims. (Cl. 236—12)

This invention relates to a thermostatically controlled mixing valve, and more particularly to a thermostatically controlled valve for accurately predetermining the relative flow of hot and cold water in order to obtain water of predetermined temperature, as at a shower bath, faucet, heating bath, etc.

It is an object of this invention to provide an improved device of the type characterized which employs a single valve for proportioning the relative flow of the fluids of different temperature.

Another object of this invention is to provide an improved device of the type characterized which is simple in construction, strong and durable, capable of nice adjustment to vary the temperature of the mixture delivered thereby, and highly efficient in operation.

Other objects will appear as the description proceeds.

The invention is capable of receiving a variety of mechanical expressions, one of which is shown on the accompanying drawing, but it is to be expressly understood that the drawing is for purposes of illustration only, and is not to be construed as a definition of the limits of the invention, reference being had to the appended claims for that purpose.

The drawing shows in sectional elevation one embodiment of the present invention.

While the invention will be described herein as embodied in a device for mixing of hot and cold water, it is to be expressly understood that the invention is not restricted thereto as the invention may be employed for obtaining mixtures of any suitable fluids, as will be apparent to those skilled in the art.

In the form shown, a casing 1 of any suitable size, construction and material is provided at one side thereof with a cold water inlet 2 and in the end thereof with a hot water inlet 3. As shown, said cold water inlet 2 is formed integrally with the casing 1, but it may be made as a detachable nipple if preferred, and is threaded or otherwise suitably formed for the attachment of a cold water pipe thereto. The hot water inlet 3, on the other hand, is shown as formed as a separable nipple having screw threaded engagement with an aperture in the end of the casing 1 and itself screw threaded or otherwise suitably formed for the attachment of a hot water pipe thereto. Suitably arranged adjacent the opposite end of the casing 1 is a mixture outlet 4, here shown as formed integrally with the casing and screw threaded or otherwise suitably formed for the attachment of a pipe leading to the shower bath, faucet, heating bath, or whatever other device is to be supplied with water of a predetermined temperature.

The interior of the casing 1 adjacent the cold water inlet 2 is provided with a wall having an aperture aligned with the hot water inlet 3 and suitably formed to provide a seat 5 for the valve member. Opposed to said valve seat 5 is a second seat 6, the inner end of the nipple 3 being shown as suitably formed to provide the same. Interposed between the valve seats 5 and 6 is a valve member 7 of any suitable construction and material, the same being urged toward the seat 5 by a coil spring 8 engaging the valve member at one end and seated on a shoulder in the nipple 3 at its opposite end. Valve member 7 is attached in any suitable way to the threaded extremity 8' of a valve stem 9, as by the nut and washer indicated at 10. At its opposite end the valve stem 9 is enlarged into a head which has slidable engagement within a tubular member 11, said member 11 at its opposite extremity having a head 13 fixedly attached thereto, as by spinning the tubular member 11 into a groove in said head. Interposed between the head on the valve stem 9, which normally engages the inwardly bent end of said tubular member 11, and said head 13 is a coil spring 12 which urges the head end of the valve stem 9 into engagement with said inwardly bent end of the tubular member 11, said coil spring 12 yielding, however, if the head 13 continues to move after the valve member 7 has engaged seat 6 to permit said tubular member 11 to over-run the head on the stem 9.

The head 13 engages the movable end wall 14 of an expansible and collapsible corrugated tubular metal wall or bellows 15 which is disposed axially within and has its opposite and stationary end suitably secured, as by soldering or brazing, to the apertured end 16 of a tubular container 17 which, at its opposite end, is suitably secured to a threaded plug 19 for a purpose hereinafter explained. Communicating with the interior of the annular space thus provided by said bellows 15 and the wall of the tubular member 17 is an elongated tubular conduit 18 here shown as coiled around said tubular member 17 and disposed within the chamber provided by the casing 1. Chamber 17 and tube 18 are charged with a suitable thermosensitive fluid, preferably a liquid which completely fills said tube and annular space within said chamber, so that the thermostat operates by liquid expansion, and expansion of said liquid expands the expansible and contractible chamber formed between the tubular member 17 and bellows 15 to collapse the latter and move the valve member away from its seat 5.

The end of the casing 1 opposite the nipple 3 is provided with an aperture which receives a threaded cap 21 having a threaded aperture 20 in which the threaded plug 19 is adjustably received. Threaded plug 19 may be locked in the cap 21 in any suitable way, as by a lock nut 22 cooperating with the end of the plug 19 which projects exteriorly of the cap 21. A closure cap 23 may be and preferably is threadly attached to the end of the cap 21 to enclose the lock nut 22.

The parts assume the relative position shown in the drawing when no fluid is flowing through the valve casing 1, the valve member 7 being urged by spring 8 against the seat 5 and the port 6 being open to its widest extent. Now assume that a faucet or other valve in the line communicating with the mixture outlet 4 is opened: Hot water flows through the nipple 3 to the chamber within the casing 1 which contains the elongated tube 18 coiled around the chamber 17. Owing to the relatively large surface provided by the long coiled tube 18 the hot water promptly causes an expansion of the fluid within the tube 18, thereby transmitting a pressure to the fluid within the chamber 17, and this pressure acting on the movable end wall 14 of the bellows 15 moves the head 13, tubular member 11, coil spring 12, valve stem 9 and valve member 7 away from the port 5 and toward the port 6, admitting cold water through the inlet 2. The movement of the valve member 7 toward the port 6 continues until the temperature of the water in contact with the tube 18 is that which is desired, at which time further expansion of the thermostat and movement of the valve member 7 is terminated. In this position the valve member 7 is removed from both seats 5 and 6 and proportions the flow of hot and cold water so as to maintain the predetermined temperature desired in the outlet 4. Any fluctuation of temperature at the tube 18 is immediately followed by a repositioning of the valve member 17 to reapportion the hot and cold water flow to restore the desired operating temperature.

Under normal operating conditions the operating train from the movable end wall 14 of the bellows 15 to the valve member 7 acts as a single rigid unit, the coil spring 12 transmitting the movement of the head 13 to the head of the valve stem 9, and thence to the valve member 7. If, however, the temperature in the valve casing 1 should continue to rise for any reason after the valve member 7 has been moved into contact with the seat 6, so that the pressure within the chamber 17 continues to urge the movable end wall 14 toward the valve member 7, soil spring 12 may yield and the tubular member 11 slide over the head of the valve stem 9, so that injury to the parts is avoided.

By removing the cap 23 access may be gained to the lock nut 22 and by loosening said lock nut the threaded plug 19 may be adjusted inwardly or outwardly with respect to the cap 21, the outer end of the plug 19 being suitably shaped or formed so as to facilitate engagement and rotation thereof. Movement of the plug 19 causes the chamber 17 supported thereby, together with the tube 18 carried by said chamber, to be advanced toward or away from the valve member whereby the tension on the spring 8 or the relation of wall 14 to head 13 my be varied, thereby varying the amount of expansion of the thermo-sensitive fluid in the thermostat required to remove the valve member 7 from its seat 5, or in other words, to predetermine the magnitude of movement of the valve member 7 required to obtain the desired proportion of hot and cold fluid flowing through the two ports 5 and 6.

It will therefore be perceived that by the present invention a relatively simple, compact and rugged construction of thermostatically operated mixing valve has been provided which employs a single valve member for predeterminately proportioning the flow of hot and cold fluids and which at the same time may be readily adjusted so as to vary the temperature of the mixture delivered thereby.

While the embodiment of the invention illustrated on the drawing has been described with considerable particularity, it is to be expressly understood that the invention is not to be restricted thereto, as the same is capable of receiving a variety of mechanical expressions, some of which will now readily suggest themselves to those skilled in the art, while changes may be made in the details of construction, arrangement, materials employed, proportion of parts, etc., without departing from the spirit of this invention. Reference is therefore to be had to the appended claims for a definition of said invention.

What is claimed is:

1. In a thermostatically operated mixing valve, in combination with a valve casing and inlets thereto for fluids to be mixed, means in said casing providing opposed valve ports which respectively communicate with said inlets for the fluids to be mixed, a single valve member disposed between and adapted to cooperate with both of said ports, a thermostat comprising a vessel charged with a fluid and including an expansible and contractible inner wall which is collapsed by expansion of said fluid, said thermostat being disposed in said casing on the mixture side of said ports, means operatively connecting said thermostat and said valve member to dispose said valve member between said ports to control both of said ports and proportion the amounts of fluids admitted therethrough, a support for said thermostat adjustable from the exterior of said casing for bodily moving said thermostat relatively to said valve ports, and resilient means cooperating with said valve member on the opposite side thereof from said thermostat and normally urging the same toward one of said ports.

2. In a thermostatically operated mixing valve, in combination with a valve casing and inlets thereto for fluids to be mixed, means in said casing providing opposed valve ports which respectively communicate with said inlets for the fluids to be mixed, a single valve member disposed between and adapted to cooperate with both of said ports, a thermostat comprising a vessel charged with a fluid and including an expansible and contractible inner wall which is collapsed by expansion of said fluid, said thermostat being disposed in said casing on the mixture side of said ports, means including a yieldable member operatively connecting said thermostat and said valve member to dispose said valve member between said ports to control both of said ports and proportion the amounts of fluids admitted therethrough, resilient means cooperating with said valve member and normally urging the same toward one of said ports, and an adjustable support for said thermostat for bodily moving said thermostat toward and from said valve ports to adjust the thermostat with respect to the said resilient means to predetermine the temperature of said mixture.

3. In a thermostatically operated mixing valve, in combination with a valve casing and inlets thereto for fluids to be mixed, means in said casing providing opposed valve ports which respectively communicate with said inlets for the fluids to be mixed, a single valve member disposed between and adapted to cooperate with both of said ports, resilient means on one side of said valve member for urging said valve member in one direction, a thermostat disposed in said casing on the mixture side of said ports and operatively connected to said valve member to dispose the same between said ports to control both of said ports and proportion the amounts of fluids admitted therethrough, said thermostat comprising a chamber having an expansible and collapsible inner wall and an elongated tubular conduit communicating with said chamber and coiled about the same, said chamber and conduit being charged with a thermosensitive fluid, and a support on which said chamber and conduit are carried, said support being adjustable to advance or withdraw said thermostat to and from said valve ports.

4. In a thermostatically operated mixing valve, in combination with a valve casing and inlets thereto for fluids to be mixed, means in said casing providing opposed valve ports which respectively communicate with said inlets for the fluids to be mixed, a single valve member disposed between and adapted to cooperate with both of said ports, a thermostat disposed in said casing on the mixture side of said ports and operatively connected to said valve member to dispose the same between said ports to control both of said ports and proportion the amounts of fluids admitted therethrough, said thermostat including a tubular chamber, a bellows extending axially within said chamber and providing an annular space therebetween, and an elongated tubular conduit communicating with said annular space and coiled around said chamber, said annular space and said tubular conduit being filled with a liquid whereby expansion of said liquid collapses said bellows and said operative connections between said valve member and said bellows including a yieldable member adapted to be engaged and moved by the movable end wall of said bellows, resilient means on the opposite side of said valve member from said thermostat for urging said valve member in one direction, and means at the opposite side of said thermostat from said valve member for adjusting said thermostat and valve member.

5. In a thermostatically operated mixing valve, in combination with a valve casing and inlets thereto for fluids to be mixed, means in said casing providing opposed valve ports which respectively communicate with said inlets for the fluids to be mixed, a single valve member disposed between and adapted to cooperate with both of said ports, resilient means cooperating with said valve member on one side thereof, a thermostat disposed in said casing on the mixture side of said ports and operatively connected to said valve member to dispose the same between said ports to control both of said ports and proportion the amounts of fluids admitted therethrough, said thermostat including an expansible and collapsible chamber having a rigid exterior wall in contact with said mixture and a flexible inner wall and said operative connections between said thermostat and said valve member including a valve stem structure adapted to be operated by the movable wall of said chamber and including a member attached to said valve member, a tubular member adapted to have telescopic engagement with said first named member, a head to which said tubular member is attached and which is adapted to be moved by the movable wall of said expansible and collapsible chamber, and a coil spring interposed between said first named member and said head and normally maintaining the same in predetermined spaced relationship but yieldable upon continued expansion of said expansible and collapsible chamber after said valve member has been brought to rest, and means at the mixture side of said valve for adjusting said thermostat.

6. In a thermostatically operated mixing valve, in combination with a valve casing and inlets thereto for fluids to be mixed, means in said casing providing opposed valve ports which respectively communicate with said inlets for the fluids to be mixed, a single valve member disposed between and adapted to cooperate with both of said ports, a thermostat disposed in said casing on the mixture side of said ports and operatively connected to said valve member to dispose the same between said ports to control both of said ports and proportion the amounts of fluids admitted therethrough, and means for supporting said thermostat and movable in the direction of the axis of said valve member to move said thermostat bodily toward and away from said valve ports, said supporting means being accessible from the exterior of said valve casing to adjust said thermostat, and resilient means cooperating with said valve member at the opposite side thereof from said thermostat for urging said valve member in one direction.

7. In a thermostatically operated mixing valve, in combination with a valve casing and inlets thereto for fluids to be mixed, means in said casing providing opposed valve ports which respectively communicate with said inlets for the fluids to be mixed, a single valve member disposed between and adapted to cooperate with both of said ports, a thermostat disposed in said casing on the mixture side of said ports and operatively connected to said valve member to dispose the same between said ports to control both of said ports and proportion the amounts of fluids admitted thereby, said thermostat having a rigid exterior wall in contact with said mixture and a reentrant flexible inner wall also in contact with said mixture, a spring engaging said valve member on the opposite side thereof from said thermostat, said valve member being positioned by the expansion of said thermostat between said valve ports to adjustably maintain such proportion of fluids admitted to said valve casing as to maintain a predetermined temperature of the mixture existing in said casing, and a support on which said thermostat is mounted for bodily adjustment toward and away from said valve ports.

JOHN E. DUBE.